United States Patent [19]
Bürgel et al.

[11] 3,805,539
[45] Apr. 23, 1974

[54] CONTROL CIRCUIT FOR REFRIGERATORS

[75] Inventors: Joachim Bürgel, Sandershausen; Alexander Heider, Kassel-Ndzw., both of Germany

[73] Assignee: Licentia Patent-Verwaltungs-GmbH, Frankfurt am Main, Germany

[22] Filed: July 13, 1972

[21] Appl. No.: 271,255

[30] Foreign Application Priority Data
July 14, 1971  Germany............................ 2135006

[52] U.S. Cl..................... 62/148, 219/494, 219/497
[51] Int. Cl........................ F25b 15/00, H05b 1/02
[58] Field of Search ...... 62/148; 219/494, 499, 501, 219/497

[56] References Cited
UNITED STATES PATENTS

| | | | |
|---|---|---|---|
| 3,678,247 | 7/1972 | Sawa et al............................ | 219/499 |
| 3,584,291 | 6/1971 | Budniak.............................. | 219/501 |
| 3,553,429 | 1/1971 | Nelson................................ | 219/497 |
| 3,225,173 | 12/1965 | Cook et al. ......................... | 219/494 |
| 3,197,616 | 7/1965 | Gade et al. ......................... | 219/499 |
| 2,806,200 | 9/1957 | Ketchledge.......................... | 323/68 |
| 2,164,730 | 7/1939 | Bäckström.......................... | 62/148 |

FOREIGN PATENTS OR APPLICATIONS
1,210,432  10/1970  Great Britain..................... 219/417

*Primary Examiner*—Meyer Perlin
*Assistant Examiner*—Paul Devinsky
*Attorney, Agent, or Firm*—Spencer & Kaye

[57] ABSTRACT

An electronic control circuit for absorption-type refrigerators having electric heating. A controllable switching device of the pulse-controlled phase interruption type is connected in series with the heating unit. A control circuit is coupled to the switching device and is operatively arranged to supply a train of pulses to the switching device. The control circuit is provided wih an input from a temperature sensor which senses the temperature in the cooling chamber of the absorption-type refrigerator and with a second input from a rated value generator. The width of the pulses and the intervals between the pulses of the train of pulses supplied from the control circuit are determined by comparing the inputs from the temperature sensor and the rated value generator.

6 Claims, 5 Drawing Figures

3,805,539

CONTROL CIRCUIT FOR REFRIGERATORS

BACKGROUND OF THE INVENTION

This invention relates to absorption-type refrigerators having electrical heating. The present invention relates, more particularly, to an absorption-type refrigerator having an electronic control circuit arrangement with which it is possible to automatically set the operating conditions of the heating unit of an absorption-type refrigerator, in dependence on different influence parameters, to an optimum operating point.

As has been shown by appropriate tests on absorption-type refrigerators, their efficiency and attainable cooling output substantially depend on an optimum heating output of the heating unit and is directly dependent on the ambient temperature. Other variable operating conditions which have an effect on the determination of the optimum operating point are the supply voltage, the maximum permissible evaporator temperature and the desired, manually settable, cooling chamber temperature. Since experience has shown that a constant supply voltage, and thus a defined heating output, can hardly ever be found and the ambient temperature is not, of course, always constant, there arises the requirement for automatically compensating for these variable criteria in order to attain optimum heating output.

The optimum heating output can be attained using conventional circuit arrangements only for a precisely defined operating case. The cooling temperature, for absorption-type refrigerators, in relation to the heating output for different ambient temperatures, requires that more energy must be expended initially in order to obtain satisfactory cooling temperatures at increased ambient temperatures or the heating output, which is designed for normal ambient temperatures, will no longer be sufficient to produce the desired cooling output when the ambient temperature rises.

If the requirements occurring in practice are to be considered as far as possible in the design of an absorption-type refrigerator, this inevitably leads to a design which can only rarely be considered "optimum," since the different influencing parameters will hardly ever combine to result in the same operating value. A heating unit designed under these conditions operates optimally only at one point. Absorption-type refrigerators are, therefore, generally so designed that they reach their optimum operating range at higher ambient temperatures and with a supply voltage deviation of approximately −15 percent.

It will be appreciated, however, that, on a yearly average, the absorption-type refrigerators designed in accordance with the above-mentioned criteria are subjected to much lower ambient temperatures and from about 30 percent to about 40 percent more energy is consumed at possibly occurring higher supply voltages, resulting in a poorer overall efficiency.

SUMMARY OF THE INVENTION

It is a principal object of the present invention to provide a control circuit arrangement for absorption-type refrigerators which avoids the aforementioned disadvantages.

It is another object of the present invention to provide a control circuit arrangement for absorption-type refrigerators which makes it possible, under consideration of the above-mentioned different influential parameters, to automatically set the optimum operating point and to maintain it, even when one or more of the parameters vary.

The foregoing and other objects are accomplished in accordance with the present invention by an electronic control circuit for absorption-type refrigerators having electric heating. A controllable switching device of the pulse-controlled phase interrupted type is connected in series with the heating unit of the absorption-type refrigerator. A control circuit is coupled to the switching device and is operatively arranged to supply a train of pulses to the switching device to effect the switching thereof. A temperature sensor which senses the temperature in the cooling chamber of the refrigerator is operatively arranged to supply a first input to the control circuit. A rated value generator is operatively arranged to supply a second input to the control circuit. The width of the pulses and the intervals between the pulses of the train of pulses supplied from the control circuit are determined by comparing the inputs from the temperature sensor and the rated value generator.

The heating unit is preferably operated via a semiconductor switching circuit of the pulse-controlled phase interruption type, the control of the switching circuit being effected by means of pulse trains whose pulse width and pulse intervals depend on a comparison between a rated value generator and a sensor in the cooling chamber.

Advisably the heating unit is a single-circuit heating unit which is switched automatically by the control circuitry from full wave to half wave operation during the operating intervals in order to maintain the required basic load.

The use of such a single-circuit heating unit, as compared to the usual two-circuit heating units, which have one of their windings continuously connected to the supply, or mains, voltage in order to maintain operational readiness, not only increases the operating dependability, but together with the energy requirement which is precisely adapted to the particular case at hand, it also attains a favorable relationship between the increased expenditures and the resulting savings.

DESCRIPTION OF THE PREFERRED EMBODIMENTS

Figure 1:
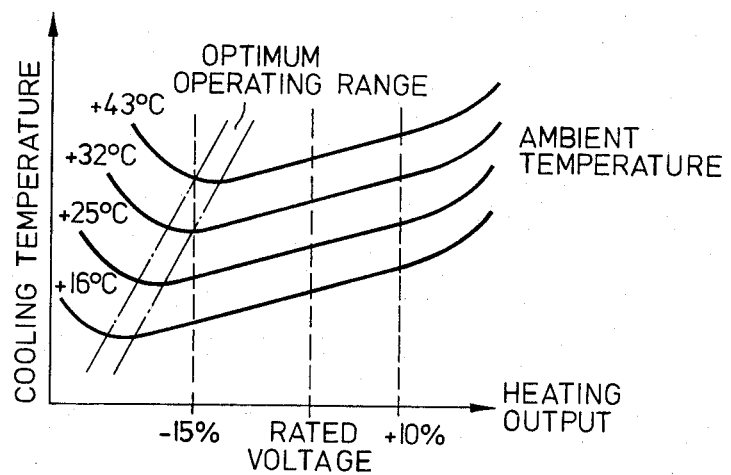
FIG. 1 is a graphical representation of cooling temperature in relation to heating output for absorption-type refrigerators, separate characteristic curves being shown for different ambient temperatures.

In FIG. 1 a family of curves for the different ambient temperatures 16°C, 25°C, 32°C and 43°C which expectedly could be encountered by an absorption-type refrigerator, illustrate graphically the cooling temperature versus heating output characteristics of an absorption-type refrigerator. It is clear from FIG. 1 that the optimum operating range varies as the ambient temperature changes and also as the mains voltage varies.

The present invention, as mentioned above, provides a control circuit for absorption-type refrigerators in which variations of mains voltage as well as changes in ambient temperature are substantially compensated, operation of the absorption-type refrigerator being possible in its optimum operating range despite wide variations in mains voltage and/or ambient temperature.

Figure 2:
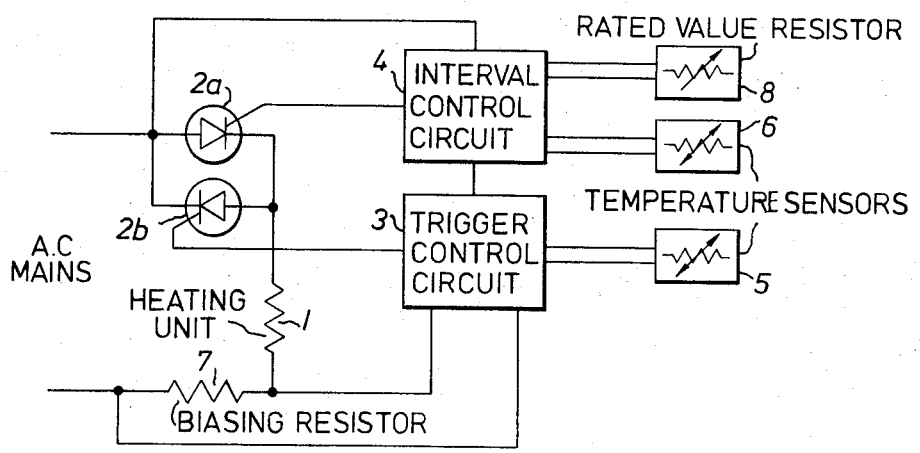
FIG. 2 is a schematic block diagram of an electronic control circuit arrangement for absorption-type refrigerators according to the present invention.

As illustrated in FIG. 2 the electronic control circuit for absorption-type refrigerators is connected to control the load, i.e., the heating unit 1 of the refrigerator and includes a semiconductor switching circuit 2a and 2b connected in series with the heating unit 1. The switching circuit 2a and 2b, as shown in FIG. 2, is formed by two thyristors connected in parallel opposition. It is to be understood that other types of switching circuits could as readily be used. The switching circuit 2a and 2b is of the pulse-controlled phase interruption type. A first temperature sensor 5, preferably a thermistor, is operatively arranged to sense the ambient temperature. The cooling chamber temperature is sensed by a second temperature sensor 6, preferably also a thermistor. A trigger control circuit 3 and an interval control circuit 4 are respectively coupled to the temperature sensors 5 and 6. A biasing resistor 7 is connected in series with the heating unit 1 and to one side of the voltage mains. A rated value generator 8, which may comprise a settable variable impedance, is coupled to an input of the interval control circuit 4.

Figure 4:
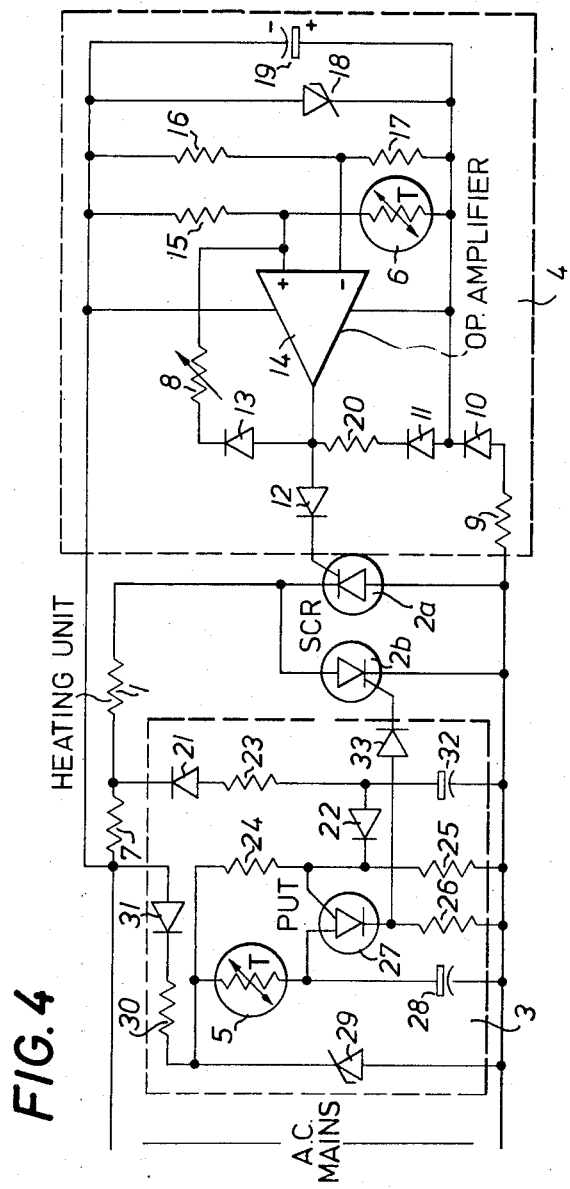
FIG. 4 shows a schematic circuit diagram of an automatic-control circuit with SCR application.

A more detailed illustration of a preferred embodiment of a control circuit according to the invention is shown in FIG. 4. The switching circuit of the arrangement shown in FIG. 4 include two SCR's 2a and 2b. The SCR 2a associated with the negative half-cycles of the sine wave of the mains voltage has its operation synchronized by the interval control circuit 4. The on-off time of element 2a is dependent on the cooling chamber temperature and the rated value resistor 8. The temperature sensor 6 in the cooling chamber operates in conjunction with resistors 15, 16 and 17 in a bridge circuit. The diagonal voltage of the bridge circuit is connected to the differential input of a linear operational amplifier 14.

Because of the positive feedback via a diode 13 and the variable rated value resistor 8 (or stage — selector switch with voltage divider) the amplifier 14 works as a snap-action amplifier. The feedback of the resistance value of the resistor 8, dependent upon the resistance value of temperature sensor 6, fixes the point of disconnection. The connection thus is dependent only upon the resistance value of the temperature sensor 6, if the bridge 15, 16, 17 is initially balanced. Under these conditions the voltage output of the amplifier 14 is not positive.

The operating current for the interval control circuit (electronic thermostat) 4 is supplied via a resistor 9 and a diode 10 and is stabilized by a diode 18 and a capacitor 19.

The ignition voltage for the SCR 2a is supplied via a diode 11, a safety resistor 20 and a diode 12. The diodes 12 and 13 are simultaneously effective for turning off the gate of the SCR 2a.

With this circuit the sinusoidal negative half waves of the mains voltage are supplied to the heating unit 1 as long as the rated temperature at the cooling chamber is too low, as sensed by the temperature sensor 6.

If the cooling chamber temperature corresponds to the rated temperature, as determined by the rated value resistor 8, the output voltage from the switching amplifier 14 is not positive and the ignition voltage is short-circuited.

The heating unit 1 is then connected only to the sinusoidal positive half waves of the mains voltage via a SCR 2b.

When the cooling chamber temperature reaches a predetermined higher value, the amplifier 14 is switched-on and the output voltage becomes positive for synchronizing the SCR 2a. This process is independent of feedback, for at this moment the output voltage of amplifier 14 is still not positive.

The SCR 2b for the positive half cycle is triggered from the trigger control circuit 3 in dependence upon the ambient temperature and the potential difference between a biasing resistor 7 and the heating unit 1. The potential difference is proportional to the fluctuations in the mains voltage.

The forward flow angle at the SCR 2b is dependent upon the point of time when triggering takes place. This is determined by a timing circuit, consisting of the temperature sensor 5 and a capacitor 28, which form the peak-point-voltage to a programmable unijunction transistor PUT 27.

The working point on the characteristic curve of the PUT 27 (programmable unijunction transistor) is dependent upon a voltage divider formed by resistors 24 and 25. These resistors 24 and 25 determine the potential on the control electrode of the PUT 27. A second time constant circuit is provided by a resistor 23 and a capacitor 32 via a diode 22 whereby the capacitor 32 is charged via a diode 21.

The differential voltage of the biasing resistor 7 determines the maximum charge of the capacitor 32. This operation is equivalent to the power input to heating unit 1.

The polarity of the diode 21 is responsible for the charging of the capacitor 32 only on negative cycles of the mains voltage, when the SCR 2a is conducting.

During the following positive half cycle of the sine wave of the mains voltage the diode 21 is blocked and the diode 31 simultaneously switches through the operating current to the trigger control circuit 3.

A resistor 30 and a diode 29 serve to deliver the operating current and also provide for its stabilization. The capacitor 28 is charged via the temperature sensor 5, its resistance value depending on the ambient temperature.

When the voltage level on the anode of the PUT 27 assumes a value which corresponds to the bias voltage plus the breakdown voltage, the anode-cathode resistance becomes suddenly low and the capacitors 28 and 32 are discharged via a resistor 26. The voltage drop across the resistor 26 triggers the gate of the SCR 2b via a diode 33. Through this combination of current input to the heating unit 1, the ambient temperature of the cooling apparatus and the rated value temperature, the employment of this electronic control circuit results in an optimum operation point of the apparatus.

The ambient temperature sensed by the first temperature sensor 5 forms, together with the voltage drop across the biasing resistor 7 in series with the heating unit 1, the control signal level for a known phase interruption control, whose ratio of full wave to half wave operation is determined, via a control amplifier (not shown in FIG. 2), by a comparison between the output signal determined by the rated value generator 8 and an output signal determined by the second temperature sensor 6 in the cooling chamber. Since the electrical output of the heating unit 1 is a product of current and voltage, a fluctuation in the mains voltage also results in a change in the voltage drop across the biasing resistor 7. There thus exists a proportional relation between this voltage drop and the mains voltage which permits a direct indication of the instantaneous mains voltage magnitude.

With the electronic control circuit according to the present invention, it is thus possible to influence directly the current firing phase angle of a pulsed-controlled phase interruption circuit and thus assure that the heating unit 1 is continuously supplied with a constant energy level. A prerequisite is that the heating unit 1 be designed with a rated output suitable for the lowest expected mains voltage magnitude.

The first temperature sensor 5 which is responsive to the ambient temperature is included in the control circuit in a simple manner and develops a second control signal.

Both control signals control the trigger control circuit 3 whose firing time assures the optimum energization of the heating unit 1. The period for which the trigger control circuit 4 is switched on is determined by means of a comparison between the output signal determined by the rated value generator 8 and an output signal determined by the second temperature sensor 6 disposed in the cooling chamber.

The additional thermal protection possibly required, in some cases, against excess temperatures at the evaporator may preferably be obtained by means of a PTC resistor (not shown) which is in heat-conductive contact with the evaporator and acts as an additional control of the switching circuit 2a and 2b in a suitable conventional manner.

The switching from half wave to full wave operation is effected as follows: If the second temperature sensor 6 registers a corresponding temperature rise in the cooling chamber, the oppositely poled half wave is switched in via a switching amplifier (not shown in FIG. 2) and the heating unit 1 is operated with its rated load for the required period of time.

Figure 3:
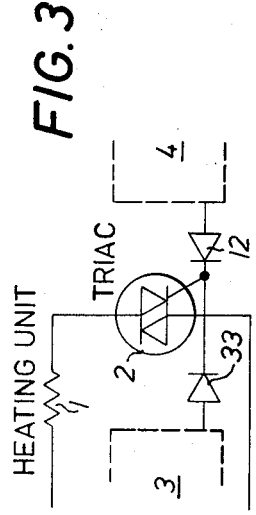
FIG. 3 shows the alternative example of operation with a TRIAC circuit.
Figure 5:
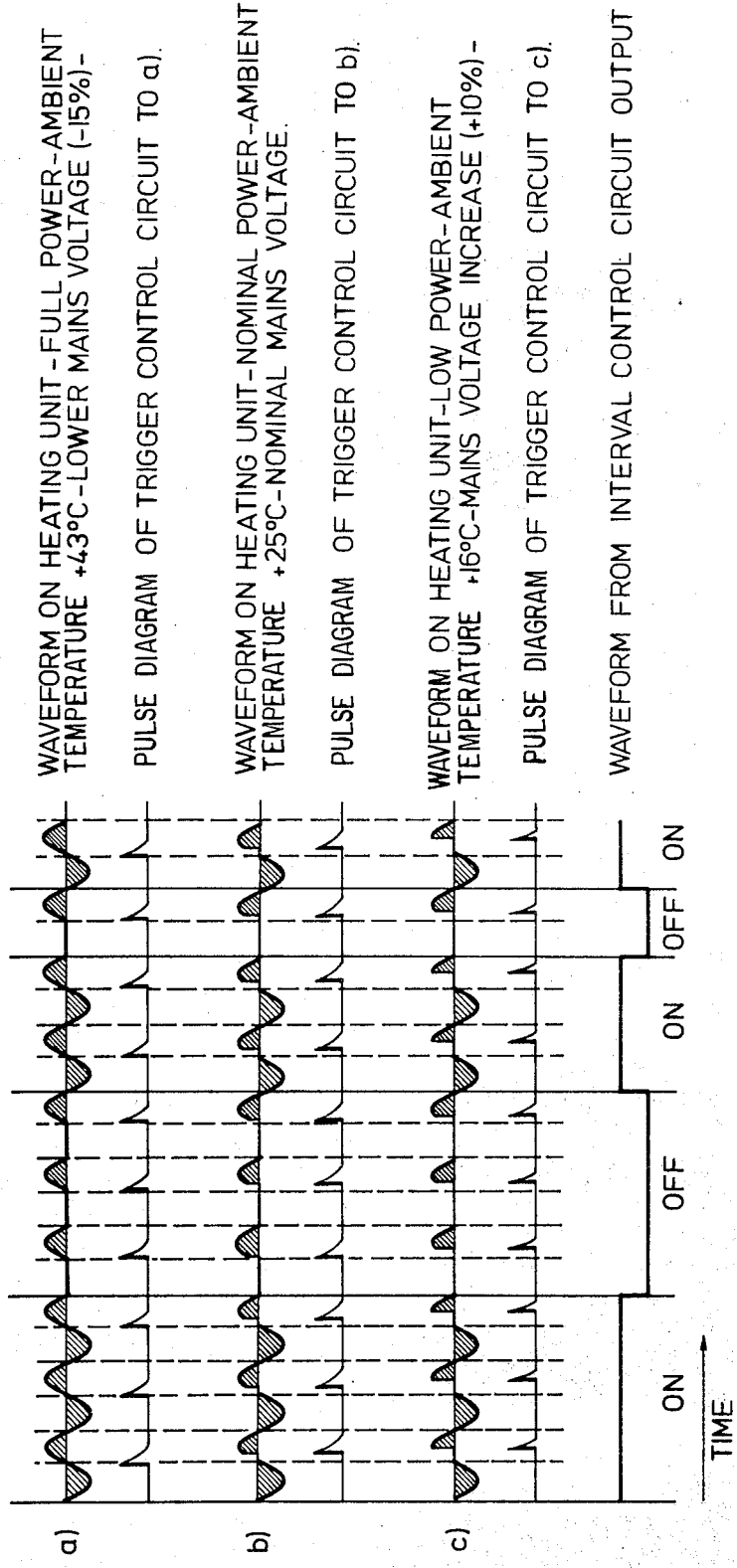
FIG. 5 shows a number of waveforms helpful in understanding the operation of the circuit illustrated in FIG. 4.

With the above-described control circuit a number of advantages are obtained compared to the conventional control devices for electrically heated absorption-type refrigerators. Firstly, there occurs a reduced energy input for the predominantly occurring ambient temperatures of from about 20°C to about 25°C. Secondly, maximum cooling output is obtained under virtually all expected environmental conditions. Thirdly, the control circuit is independent of the usual mains voltage fluctuations and deviations. Fourthly, the possibiltiy of using a simple heating unit which is inexpensive and safe to operate is realized. Fifthly, evaporator overheating at higher environmental temperatures and at excess voltages is effectively avoided or substantially reduced. As described above, the semiconductor switching circuit 2a – 2b is formed by two thyristors. It could as well be formed by a 2 as shown in FIG. 3. The circuitry of such a triac is known per se, so that it is unnecessary to explain the same in detail. The operation of the triac in connection with the other parts of the control circuit corresponds to the operation of the thyristor circuit described above.

It will be understood that the above description of the present invention is susceptible to various modifications, changes and adaptations, and the same are intended to be comprehended within the meaning and range of equivalents of the appended claims.

We claim:

1. An electronic control circuit for absorption-type refrigerators having a cooling chamber and electric heating means comprising, in combination:
   a. controllable switching means of the pulse-controlled phase interruption type connected in series with said heating means for controlling the current supplied thereto;
   b. control circuit means coupled to said controllable switching means for supplying a train of pulses thereto to effect the switching thereof;
   c. means for sensing the temperature of the cooling chamber in the absorber refrigerator coupled to an input of said control circuit means for supplying a first input thereto;
   d. means for providing a rated value input to a second input of said control circuit means, said control circuit means producing the train of pulses with the width of the pulses and the intervals between the pulses determined by comparison of the inputs received from said means for sensing the temperature in the cooling chamber and said means for providing a rated value input;
   e. means for sensing the ambient temperature coupled to a further input of said control circuit means;
   f. biasing resistor means connected in series with said heating means; and
   g. means for coupling said biasing resistor across a still further input of said control circuit means;
   h. said control circuit means being responsive to the signals supplied to said further input and said still further input for controlling said switching circuit means.

2. An electronic control circuit as defined in claim 1 wherein said heating means is a single-circuit heating unit and wherein said controllable switching means is automatically switched by said control circuit means from full wave to half wave operation during operating pauses.

3. An electronic control circuit as defined in claim 1 wherein said switching means is a semiconductor switching means.

4. An electronic control circuit as defined in claim 3 wherein said semiconductor switching means comprises two antiparallel connected thyristors.

5. An electronic control circuit as defined in claim 3 wherein said switching means comprises a triac.

6. An electronic control circuit as defined in claim 1 wherein said control circuit means is operatively arranged for switching said switching circuit means from full wave to half wave operation in a ratio determined by comparison of the inputs received from said means for sensing the temperature in the cooling chamber and said means for providing a rated value input.

* * * * *

UNITED STATES PATENT OFFICE
CERTIFICATE OF CORRECTION

Patent No. 3,805,539   Dated April 23rd, 1974

Inventor(s) Joachim Bürgel and Alexander Heider

It is certified that error appears in the above-identified patent and that said Letters Patent are hereby corrected as shown below:

In the heading of the patent, line 11, change "2135006" to --2135066--. In line 8 of the Abstract, change "wih" to --with--. Column 3, line 36, change "include" to --includes--. Column 5, line 57, change "possibilty" to --possibility--; line 64, before "2" insert --triac--.

Signed and sealed this 1st day of October 1974.

(SEAL)
Attest:

McCOY M. GIBSON JR.
Attesting Officer

C. MARSHALL DANN
Commissioner of Patents